US006783266B2

(12) United States Patent
McCoy et al.

(10) Patent No.: US 6,783,266 B2
(45) Date of Patent: Aug. 31, 2004

(54) HITCH RECEIVER WITH INTEGRAL LIGHTING, ACCESSORY PORTS AND TOWING HOOKS

(75) Inventors: Richard W. McCoy, Granger, IN (US); Thomas W. Lindenman, South Bend, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 11 days.

(21) Appl. No.: 10/182,097

(22) PCT Filed: Mar. 21, 2001

(86) PCT No.: PCT/US01/08952

§ 371 (c)(1),
(2), (4) Date: Jul. 23, 2002

(87) PCT Pub. No.: WO01/72549

PCT Pub. Date: Oct. 4, 2001

(65) Prior Publication Data

US 2003/0012029 A1 Jan. 16, 2003

Related U.S. Application Data

(60) Provisional application No. 60/192,149, filed on Mar. 24, 2000.

(51) Int. Cl.[7] ................................................. B60Q 1/00
(52) U.S. Cl. ........................ 362/485; 362/540; 340/468; 340/473
(58) Field of Search ................................. 362/485, 505, 362/506, 540, 541; 280/477; 340/468, 473, 475, 479; 224/493, 425, 500

(56) References Cited

U.S. PATENT DOCUMENTS

| 3,614,136 | A | | 10/1971 | Dent |
| 3,682,360 | A | | 8/1972 | Fletcher et al. |
| 3,768,837 | A | | 10/1973 | Reese |
| 4,106,081 | A | * | 8/1978 | Turturici ..................... 362/485 |
| 4,738,464 | A | | 4/1988 | Putnam |
| 4,800,471 | A | * | 1/1989 | Lippert ...................... 362/485 |
| 4,852,901 | A | | 8/1989 | Beasley et al. |
| 5,016,932 | A | | 5/1991 | Carter |
| 5,232,329 | A | | 8/1993 | Livingston |
| 5,289,880 | A | * | 3/1994 | Barto ...................... 172/799.5 |
| 5,364,142 | A | | 11/1994 | Coiner |
| 5,423,566 | A | | 6/1995 | Warrington et al. |
| 5,445,300 | A | | 8/1995 | Eipper et al. |
| 5,566,965 | A | | 10/1996 | Applegate |
| 5,620,198 | A | | 4/1997 | Borchers |
| 5,810,542 | A | | 9/1998 | Ostrander |
| 5,833,283 | A | | 11/1998 | Shaw |
| 5,836,494 | A | | 11/1998 | Grunsted et al. |
| 5,918,896 | A | | 7/1999 | Jenkins, Jr. |
| 5,950,891 | A | | 9/1999 | Brungardt et al. |
| 6,012,828 | A | * | 1/2000 | Pearce et al. ............... 362/506 |
| 6,139,041 | A | * | 10/2000 | Murphy ..................... 280/477 |
| 6,140,919 | A | * | 10/2000 | Buchanan ................... 340/468 |
| 6,273,448 | B1 | * | 8/2001 | Cross ......................... 280/477 |

* cited by examiner

*Primary Examiner*—Thomas M. Sember
(74) *Attorney, Agent, or Firm*—King & Schickli, PLLC

(57) ABSTRACT

A trailer hitch assembly (10) includes a frame member and a hitch receiver box (14). At least one mounting bracket (28) is carried on the frame member for securing the frame member to a vehicle. A utility light (40) is also carried on the hitch assembly (10) for lighting an area including the hitch receiving box (14).

15 Claims, 3 Drawing Sheets

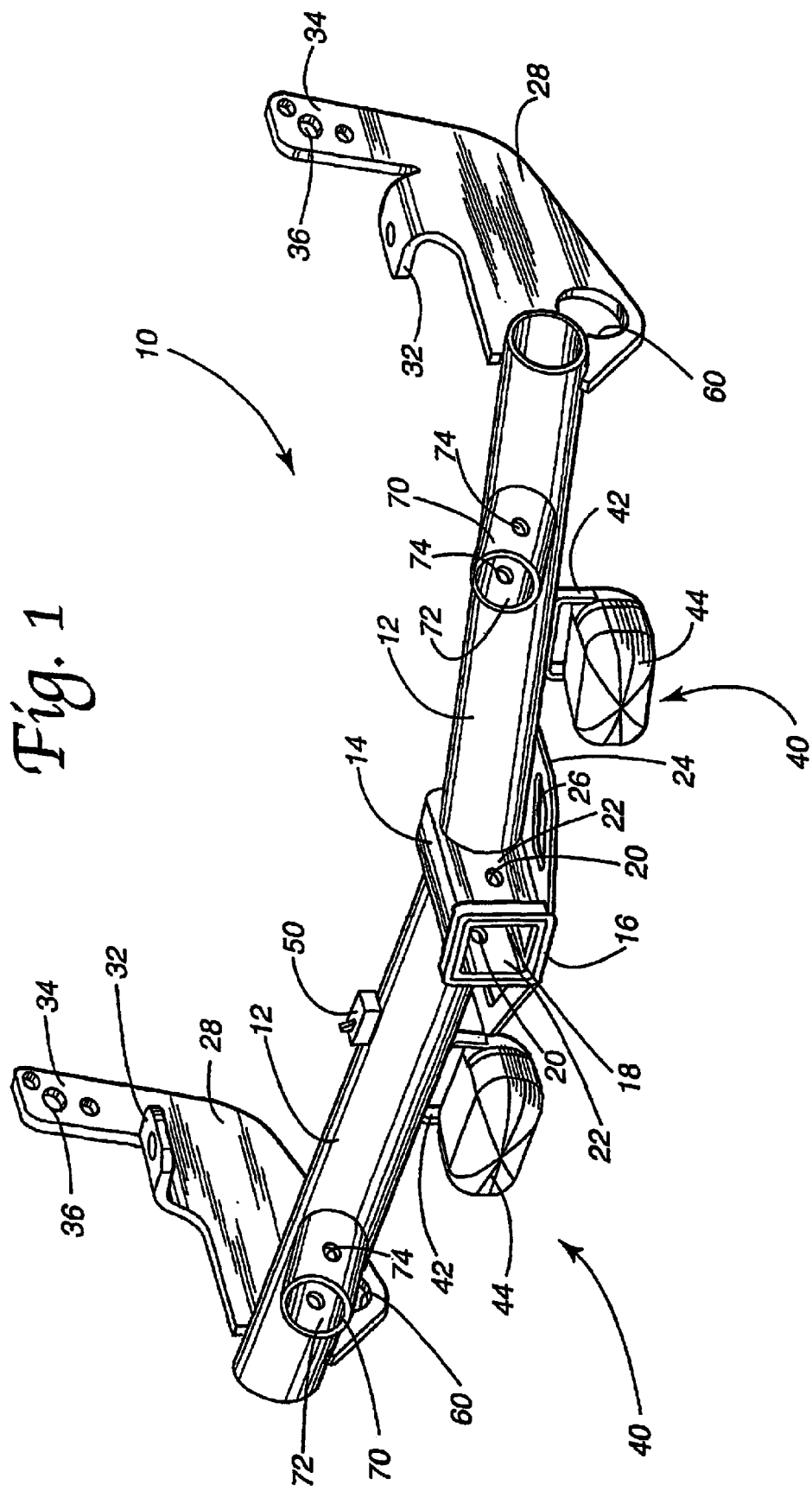

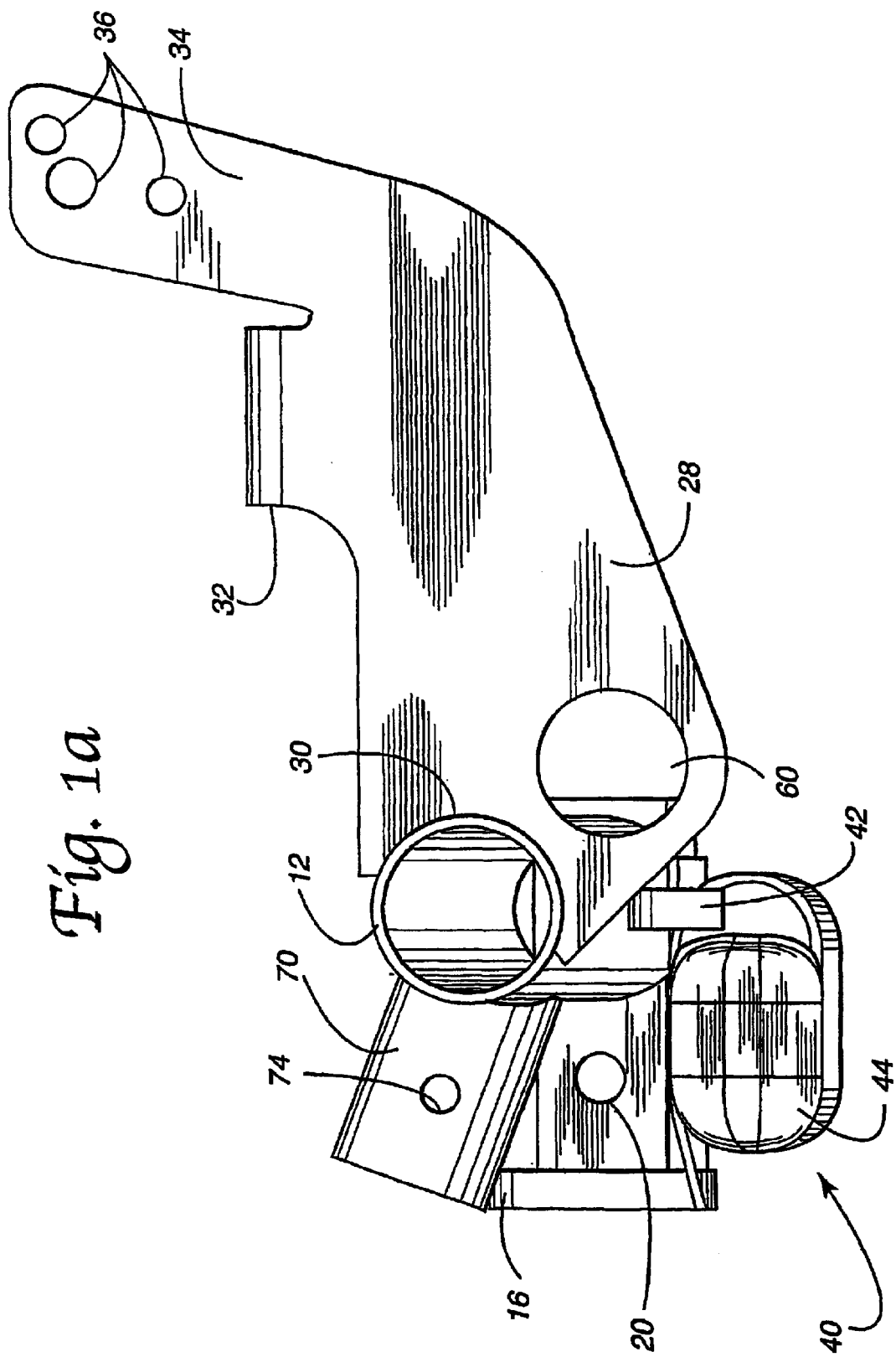

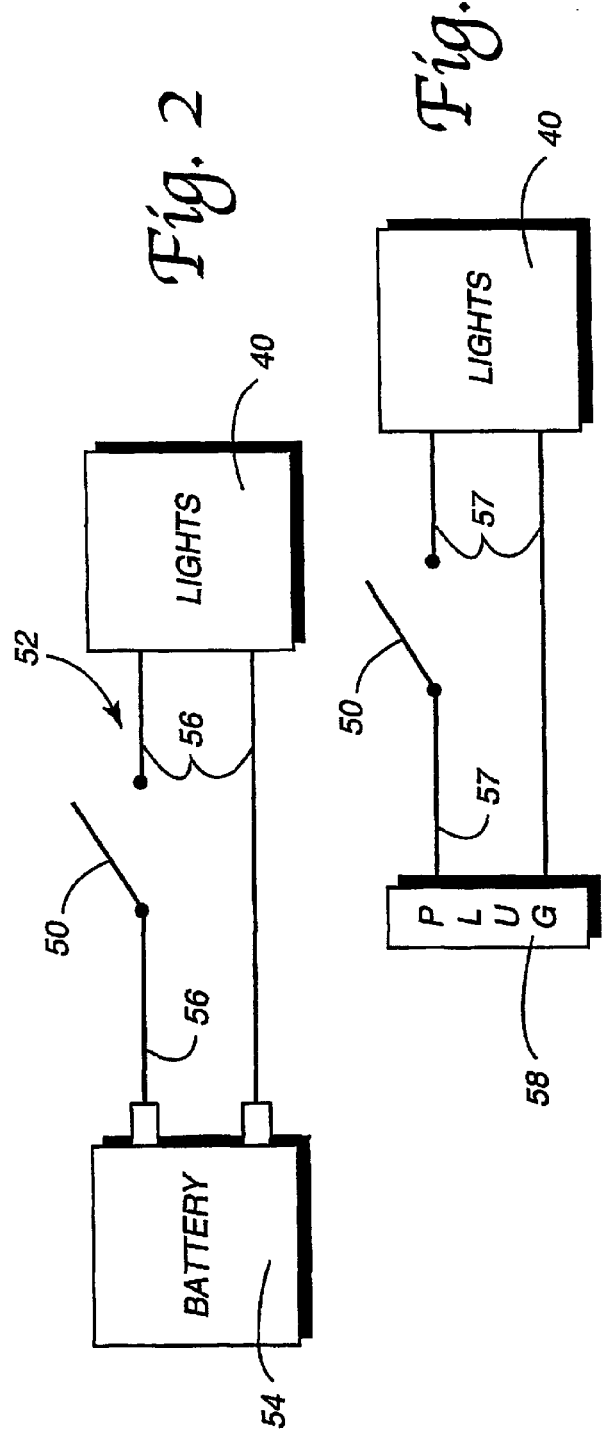
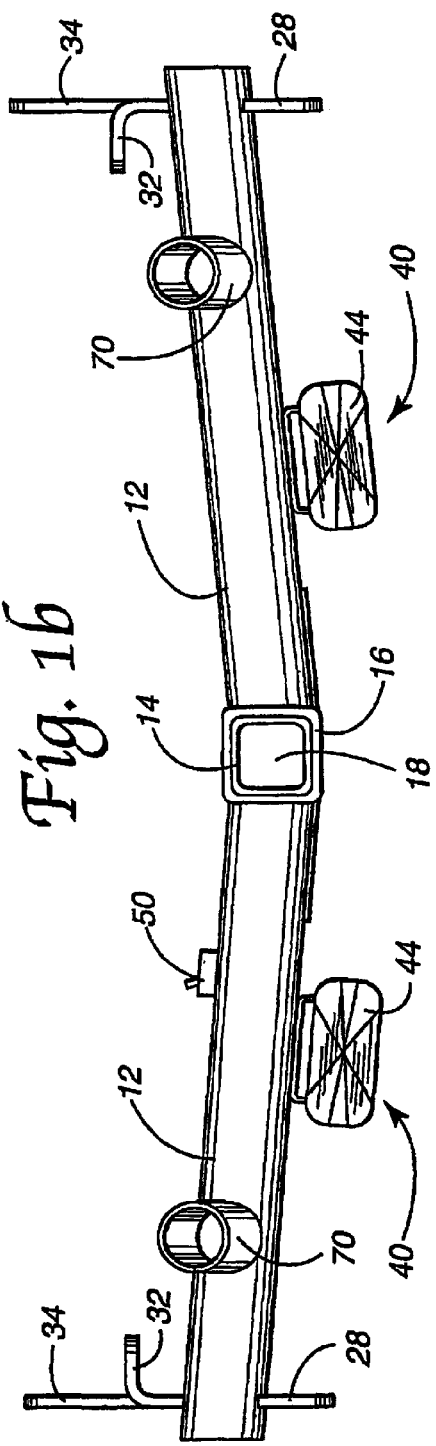

US 6,783,266 B2

HITCH RECEIVER WITH INTEGRAL LIGHTING, ACCESSORY PORTS AND TOWING HOOKS

This is a U.S. National Stage Application of International Patent Application Serial No. PCT/US01/08952 filed March 21,2001 which claims the benefit of U.S. Provisional Application Serial No. 60/192,149 filed March 24,2000.

TECHNICAL FIELD

The present invention relates generally to trailer hitch receivers and, more particularly, to a trailer hitch receiver incorporating an integral utility light which may be selectively activated to illuminate the hitch receiver so as to aid an individual in connecting a hitch bar in the hitch receiver, a hitch ball to the hitch bar and/or a trailer to the hitch ball in darkness or under low ambient light conditions.

BACKGROUND OF THE INVENTION

It has long been known to construct towing hitches that are mounted to vehicles in order to allow the towing of trailers or the like. In recent years, such hitches have been designed to include a receiver box having a rearwardly directed opening or cavity for the receipt of a hitch or draw bar that carries a hitch ball or other means allowing connection to a trailer. Examples of such a structure include U.S. Pat. No. 3,768,837 to Reese and U.S. Pat. No. 5,620,198 to Borchers, both owned by Reese Products, Inc., the Assignee of the present invention.

It is common practice for operators to remove the hitch bar and ball assembly from the receiver box when the vehicle is not being utilized to tow a trailer. Under these circumstances, the hitch bar must, of course, subsequently be reconnected in the receiver box in order to allow trailer towing.

Over the years, towing balls of various diameters have been used in towing trailers and several industry standard sizes (e.g. 1⅞", 2", 2¼" and 2 5/16" in diameter) are now in frequent use. As a result, it is not uncommon for a single towing vehicle to be used to tow various trailers where those trailers are equipped with socket assemblies adapted for operative connection with towing balls of different diameters. Thus, it is often necessary to change the towing ball on a hitch bar or ball mount of a weight distributing hitch receiver to fit the socket assembly of the trailer to be towed and thereby meet application needs.

Further, once the hitch bar is properly installed in the receiver box and the towing ball of proper size is mounted to the hitch bar (or ball mount in the case of a weight distributing hitch receiver), it is necessary to connect the trailer to the hitch ball. It should be appreciated that anyone or all three of these tasks are difficult and inconvenient to perform in darkness and/or low ambient light conditions. Further, it is difficult or impossible for an individual to hold a flashlight while making the necessary manipulations to complete the desired connections. Accordingly, a need is identified for a trailer hitch receiver incorporating an integral utility light that will light the hitch receiver box area and provide sufficient hands-free illumination to allow full visual observation during the connection process.

SUMMARY OF THE INVENTION

Advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved trailer hitch assembly is provided. The trailer hitch assembly includes (a) a central frame member, (b) at least one mounting bracket carried on the central frame member for securing the central frame member to the vehicle, (c) a hitch receiver box carried on the central frame member and (d) a utility light carried on the hitch assembly for lighting an area including the hitch receiver box. Preferably, the utility light includes an activation switch. The light may be powered by a separate battery carried on the trailer hitch assembly, or the device may include an electrical plug for drawing power from the battery of the towing vehicle.

In addition, the trailer hitch assembly may also include a safety chain plate carried on the central frame member. Such a safety chain plate includes apertures for receiving safety chains for connecting the trailer to the trailer hitch assembly and, therefore, the towing vehicle. Still further, the trailer hitch assembly may also include a pair of tow hooks and/or a pair of accessory ports connected to the central frame member. The accessory ports may receive various towing accessories such as a bike rack, snow board rack, ski rack, cargo carrier or other such accessory device known to those skilled in the art.

The present invention may also be described as a method of illuminating an area of a trailer hitch assembly. The method comprises the steps of mounting a utility light to one of the trailer hitch assembly or a towing vehicle to which the trailer hitch assembly is connected. Additionally, the method includes the step of activating the utility light as well as the step of directing illumination from the utility light over a work area including the hitch receiver box.

Advantageously, by providing appropriate illumination in accordance with the present invention, the vehicle operator maintains two free hands for manipulating tools and components as necessary to complete the connection of (a) a hitch bar in the receiver box and/or (b) a hitch ball of desired size to the hitch bar or ball mount head of a weight distributing hitch and/or (c) the trailer to the hitch ball for towing of the trailer behind the towing vehicle.

Still other objects of the present invention will become apparent to those skilled in this art from the following description wherein there is shown and described two possible embodiments of this invention, simply by way of illustration of two of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1 is a perspective view of the trailer hitch assembly of the present invention;

FIG. 1a is a side elevational view of the trailer hitch assembly of FIG. 1;

FIG. 1b is a rear elevational view of the trailer hitch assembly of FIGS. 1 and 1a;

FIG. 2 is a schematical view of a wiring circuit of a first embodiment of the present invention; and FIG. 3 is a schematical view of a wiring circuit of a second embodiment of the present invention.

Reference will now be made in detail to the present preferred embodiments of the invention, examples of which are illustrated in the accompanying drawings.

DETAILED DESCRIPTION OF THE INVENTION

Reference is now made to FIGS. 1, 1a and 1b showing a trailer hitch assembly 10 of the present invention. The trailer hitch assembly 10 includes a frame member or cross member preferably formed from a pair of tubular steel sections 12 welded to the side wall of a centrally located receiver box 14 so as to project outwardly in substantially opposing directions. The tubular steel sections 12 may be formed with a round cross section as shown in the drawing figures, an elliptical cross section; a square cross section or any other appropriate shape providing the necessary strength to function as a trailer hitch assembly.

While a two piece cross member 12 is illustrated, it should be appreciated that the cross member 12 could be another design such as a single continuous piece with the receiver box 14 welded beneath the cross member, above the cross member, behind the cross member or in the cross member.

The receiver box 14 includes a reinforced lip 16 defining an opening leading to a hitch bar receiving cavity 18. Aligned apertures 20 in the opposing side walls 22 of the receiver box 14 allow the secure connection of a hitch bar in the receiver box in a manner well known in the art by means of a connecting pin and cooperating pin clip (not shown). A chain plate 24 of steel material is welded to the receiver box 14 and tubular steel sections 12 in order to strengthen the connection. As is know in the art, chain plate 24 includes two apertures 26. The safety chains of a trailer may be connected to the chain plate 24 through engagement in these apertures 26.

Vehicle mounting brackets 28 are mounted adjacent the distal end of each tubular section 12. More specifically, each mounting bracket 28 includes a notch 30 sized and shaped to receive the tubular section 12. The brackets 28 are welded to the tubular sections 12 in order to complete the connection.

The illustrated mounting brackets 28 each include a mounting flange 32 and an upwardly projecting mounting lug 34, both with apertures 36. Nut and bolt fasteners (not shown) are extended through these apertures 36 and cooperating apertures drilled in the frame of the towing vehicle in order to mount the trailer hitch assembly 10 thereto. Of course, the arrangement of the mounting flange 32 and/or mounting lug 34 will vary from hitch assembly to hitch assembly in order to correspond to the frame of the vehicle to which the hitch assembly is to be mounted. As such, the arrangement and orientation of the flanges 32 and lugs 34 in the drawing figures are to be considered illustrative in nature and definitely not restrictive.

One or more utility lights 40 are carried on the trailer hitch assembly 10. As illustrated in Figures in 1 and 1b, two utility lights 40 are shown mounted on brackets 42 depending from the tubular sections 12. Lenses 44 are provided on the brackets 42 in order to seal out dirt and moisture from the utility lights 40. Two utility lights 40 are shown with one on each side of the receiver box 14 so as to provide the best possible illumination of the area around the receiver box and thereby substantially eliminate shadows to provide a more consistently and completely illuminated work area.

An activation switch 50 may be mounted at any convenient location along the trailer hitch assembly 10 such as on one of the tubular sections 12 to allow selective activation of the utility lights 40. It should be appreciated, however, that substantially any other convenient location could be used including for example the chain plate 24. Specifically, as shown in FIG. 2, the activation switch 50 may be used to selectively open and close an electrical circuit 52 comprising a battery 54 and electrical wiring 56 leading from the battery to the switch and to the lights 40. In this case, the separate battery 54 may be carried in, on or by one of the tubular sections 12. Alternatively, as shown in FIG. 3, the electrical circuit 52 may comprise wiring 57 and an electrical plug 58 which may be connected by means of a trailer wiring harness (not shown) to the battery of the towing vehicle.

As also shown in FIG. 1, the trailer hitch assembly 10 may incorporate a pair of tow hooks or loops 60 integrally formed in each mounting bracket 28. The tow hooks 60 may be engaged with a chain or cable in order to complete certain towing applications in a manner well known in the art.

Additionally, the trailer hitch assembly 10 may incorporate a pair of accessory ports 70. Each accessory port 70 includes a central opening or socket 72 adapted to receive the mounting post or lug of a trailer hitch accessory such as a bike rack, snow board rack, ski rack, cargo carrier or other device of a type well known in the art. Cooperating aligned apertures 74 in the sidewall or sidewalls of each accessory port 70 allow secure connection of the trailer hitch accessory by means of a connecting pin and pin clip of a type well known in the art such as also utilized to connect the hitch bar in the receiver box. Advantageously, it should be appreciated that the utility lights 40 also throw sufficient illumination in the area over the tow hooks 60 and accessory ports 70 to aid in completing connections through these structures as well.

In summary, numerous benefits have been described which result from employing the concepts of the present invention. Advantageously, the utility lights 40 are located on the tubular sections 12 of the central frame member at each side of the receiver box 14 to provide good illumination of the receiver box and the chain plate 24. In this way, one may easily connect the hitch bar in the receiver box 14, change towing balls on the hitch bar, connect a trailer to the towing ball and/or connect safety chains to the chain plate. The lighting at each side serves to substantially eliminate shadows that might otherwise obstruct visual observation of the connection work in darkness and/or low light conditions. Further, this is achieved while totally freeing the hands for the work to be completed.

Still further, it should be appreciated that the utility lights 40 are also positioned adjacent the tow hooks 60 and accessory ports 70 and therefor illuminate these structures and thereby also aid in the connection of equipment thereto in darkness and/or low light conditions. The utility lights 40 are shown in the drawing figures in brackets 42 depending downwardly from the tubular sections 12. Of course, other mounting arrangements are contemplated. For example, the utility lights 40 could be mounted in cavities in the tubular sections 12 where they are recessed and protected from inadvertent contact with objects and thus, possible damage. They also may be powered by their own independent battery 54 or by means of connection through a wiring harness to the battery of the towing vehicle. An activation switch 50 allows the lights 40 to be turned on and off as desired.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the utility lights 40 may be mounted to the body or frame of the towing vehicle where they are properly positioned to illuminate the hitch receiver box of the towing vehicle rather than necessarily to the central frame member 14. Further, while two lights 40 are illustrated, only one or three or more lights may be provided as desired.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A trailer hitch assembly for towing a trailer behind a towing vehicle, comprising:
   a frame member including a hitch receiver box;
   at least one mounting bracket carried on said frame member for securing said frame member to the vehicle;
   a utility light carried on said hitch assembly for lighting with the visible spectrum an area including said hitch receiver box; and
   a switch for selectively activating said utility light, said switch being carried on said trailer hitch assembly.

2. The trailer hitch assembly of claim 1, wherein said utility light includes a battery carried on said trailer hitch assembly for powering said utility light.

3. The trailer bitch assembly of claim 1, wherein said utility light includes an electrical plug for drawing power from a battery in said vehicle.

4. The trailer hitch assembly of claim 1, wherein said trailer hitch assembly further includes a safety chain plate carded on said frame member.

5. The trailer hitch assembly of claim 1, wherein said trailer hitch assembly further includes a pair of tow hooks carried on said frame member.

6. The trailer hitch assembly of claim 5, wherein said trailer hitch assembly further includes a pair of accessory ports carded on said frame member.

7. The trailer hitch assembly of claim 1, wherein said trailer hitch assembly further includes-a pair of accessory ports carried on said frame member.

8. A trailer hitch assembly for towing a trailer behind a towing vehicle, comprising:
   a frame member including a hitch receiver box;
   a mounting bracket carried on each end of said frame member;
   a pair of utility lights, one of said pair of utility lights carried on said frame member adjacent each side of said hitch receiver box; and
   a switch carried on said trailer hitch assembly for activating said pair of utility lights.

9. The trailer hitch assembly of claim 8, wherein said utility light includes a battery carried on said trailer hitch assembly for powering said utility light.

10. The trailer hitch assembly of claim 8, wherein said utility light includes an electrical plug for drawing power from a battery in said vehicle.

11. The trailer hitch assembly of claim 8, wherein said trailer hitch assembly further includes a safety chain plate carried on said frame member.

12. The trailer hitch assembly of claim 8, wherein said trailer hitch assembly further includes a pair of tow hooks carried on said frame member.

13. The Wailer hitch assembly of claim 12, wherein said trailer hitch assembly further includes a pair of accessory ports carried on said frame member.

14. The trailer hitch assembly of claim 8, wherein said trailer hitch assembly further includes a pair of accessory ports carried on said frame member.

15. A method of illuminating an area of a trailer hitch assembly including a hitch receiver box, comprising:
   mounting a utility light to one of said trailer hitch assembly or a towing vehicle to which said trailer hitch assembly is connected;
   providing an activation switch for said utility light on said trailer hitch assembly;
   activating said utility light; and
   directing illumination from said utility light over a work area including said hitch receiver box.

* * * * *

UNITED STATES PATENT AND TRADEMARK OFFICE
CERTIFICATE OF CORRECTION

| | | |
|---|---|---|
| PATENT NO. | : 6,783,266 B2 | Page 1 of 1 |
| APPLICATION NO. | : 10/182097 | |
| DATED | : August 31, 2004 | |
| INVENTOR(S) | : McCoy et al. | |

It is certified that error appears in the above-identified patent and that said Letters Patent is hereby corrected as shown below:

Column 5, claim 3, line 38, replace "bitch" with --hitch--

Column 6, claim 13, line 29, replace "Wailer" with --trailer--

Signed and Sealed this

Twelfth Day of December, 2006

JON W. DUDAS
*Director of the United States Patent and Trademark Office*